(12) United States Patent
Curran et al.

(10) Patent No.: US 6,704,917 B1
(45) Date of Patent: Mar. 9, 2004

(54) TABLE DRIVEN DESIGN SYSTEM AND METHOD

(75) Inventors: Michael S. Curran, Westerville, OH (US); Kevin L. Rahaman, Columbus, OH (US); Lisa Barnhart, Delaware, OH (US); James Hogan, Gahanna, OH (US)

(73) Assignee: Micro Industries Corporation, Westerville, OH (US)

( * ) Notice: Subject to any disclaimer, the term of this patent is extended or adjusted under 35 U.S.C. 154(b) by 146 days.

(21) Appl. No.: 09/717,990

(22) Filed: Nov. 21, 2000

(51) Int. Cl.[7] .............................................. G06F 9/455
(52) U.S. Cl. ................. 716/11; 716/2; 716/5; 716/9; 716/18
(58) Field of Search .................. 716/1–21; 326/39; 345/501; 700/83; 703/15; 705/1, 51, 57; 707/8, 102; 709/420; 712/20

(56) References Cited

U.S. PATENT DOCUMENTS

| | | | | |
|---|---|---|---|---|
| 4,527,249 A | * | 7/1985 | Van Brunt | 703/15 |
| 4,964,043 A | | 10/1990 | Galvin | |
| 5,031,111 A | * | 7/1991 | Chao et al. | 716/7 |
| 5,117,354 A | | 5/1992 | Long et al. | |
| 5,119,307 A | | 6/1992 | Blaha et al. | |
| 5,249,120 A | | 9/1993 | Foley | |
| 5,515,269 A | | 5/1996 | Willis et al. | |
| 5,550,750 A | | 8/1996 | Wolff | |
| 5,553,002 A | * | 9/1996 | Dangelo et al. | 716/11 |
| 5,793,632 A | | 8/1998 | Fad et al. | |
| 5,870,719 A | | 2/1999 | Martizen et al. | |
| 5,898,597 A | | 4/1999 | Scepanovic et al. | |
| 5,930,499 A | | 7/1999 | Chen et al. | |
| 5,933,145 A | | 8/1999 | Meek | |
| 5,999,908 A | * | 12/1999 | Abelow | 705/1 |
| 6,037,945 A | | 3/2000 | Loveland | |
| 6,101,488 A | | 8/2000 | Hayashi et al. | |
| 6,145,117 A | * | 11/2000 | Eng | 716/18 |
| 6,269,467 B1 | * | 7/2001 | Chang et al. | 716/1 |

OTHER PUBLICATIONS

"SpinCircuit" website homepage printout Apr. 14, 2000 http://www.spincircuit.com/.
"Dot–com craze zeroes in on memory design," *Electronic Engineering EE Times*, Apr. 17, 2000.
Web tool lifts lid on 'design discovery', *Electronic Engineering EE Times*, May 1, 2000.
"SpinCircuit" website homepage printout Apr. 14, 2000.

* cited by examiner

*Primary Examiner*—Vuthe Siek
*Assistant Examiner*—Yelena Rossoshek
(74) *Attorney, Agent, or Firm*—Standley Law Group LLP

(57) ABSTRACT

The present invention includes a table-driven system for guiding a user through the design of an electronic component. The system utilizes data tables that are adapted to house data relating an electronic component. A modular program is used to extract data from these tables. The modular program contains system logic to utilize this data in guiding the user through the process. A terminal is then used to allow a user to make selections from the choices prompted by the modular program and complete the design process.

20 Claims, 4 Drawing Sheets

TABLE DRIVEN DESIGN SYSTEM AND METHOD

BACKGROUND AND SUMMARY OF THE INVENTION

The present invention relates generally to Internet based design. Particularly, the present invention relates to a table-driven tool for guiding a user through the design of a product.

In allowing users to design and order their own customized products, several problems may arise. For instance, users often may not take into consideration a variety of mechanical, electrical, or physical characteristics of a product.

Allowing users to select and design components typically also requires a user to have access to the database storing the appropriate information. This causes problems not only in areas of database security, but also in the fact that any database update requires taking the system offline for a certain period of time.

Another problem that often arises with such systems is the need to make revisions to logic or features of the system. It is a tedious and costly process to develop, release, integrate, and support entirely new versions of a system each time a new feature is to be added or a new approach implemented.

It is therefore an object of the present invention to develop an automated design tool that guides users through the design process and allows updating or changing of system logic without revision of the entire system, while maintaining data security and allowing system updating or servicing without system down time.

The present invention includes a table-driven system for guiding a user through the design of an electronic component. The system utilizes data tables that are adapted to house data relating an electronic component. A modular program is used to extract data from these tables. The modular program contains system logic to utilize this data in guiding the user through the process. A terminal is then used to allow a user to make selections from the choices prompted by the modular program and complete the design process.

Also included in the present invention is a method for guiding a user through the design of an electronic component. First, the user is prompted to select the type of electronic component to be designed. The appropriate block is then activated for that electronic component, where the block is adapted to interface with data tables in order to prompt the user to enter selections for each feature of the selected component type. The selections are then collected for each feature in response to these prompts. The requirements for the selections are checked and the feasibility of the design determined. Once the user has completed the steps for a feasible electronic component, the user is prompted to approve the device.

BRIEF DESCRIPTION OF THE DRAWING(S)

DETAILED DESCRIPTION OF THE PREFERRED EMBODIMENT(S)

Although the present invention is described in accordance with a preferred embodiment, that is currently believed to be the best mode, it is understood that many modifications to the present invention may be made without departing from the scope of the present invention.

The Virtual Product Designer (VPD) toolset of the present invention is based on tables that have been created to logically guide a user through the design process. The design logic is based on the required functionality and necessary features for an product of the present invention. The tables and associated logic are designed to function together like a flowchart, allowing a user to move forward in the design process, as well as move back to previously selected options in order to make changes or verify information. The tables provide the logic for the interrelationships between modules and electronic devices; This allows major additions or changes to be made in device interconnectivity by modifying only the tables, not the modular program. Navigational changes may also be handled in this manner, as the navigation, questions, and logical links for all selections are maintained in the tables. The sequence of input is preferably also determined in the tables, such that reordering the input or changing the number of elements in the design flow may be accomplished simply by modifying the tables.

Figure 1:
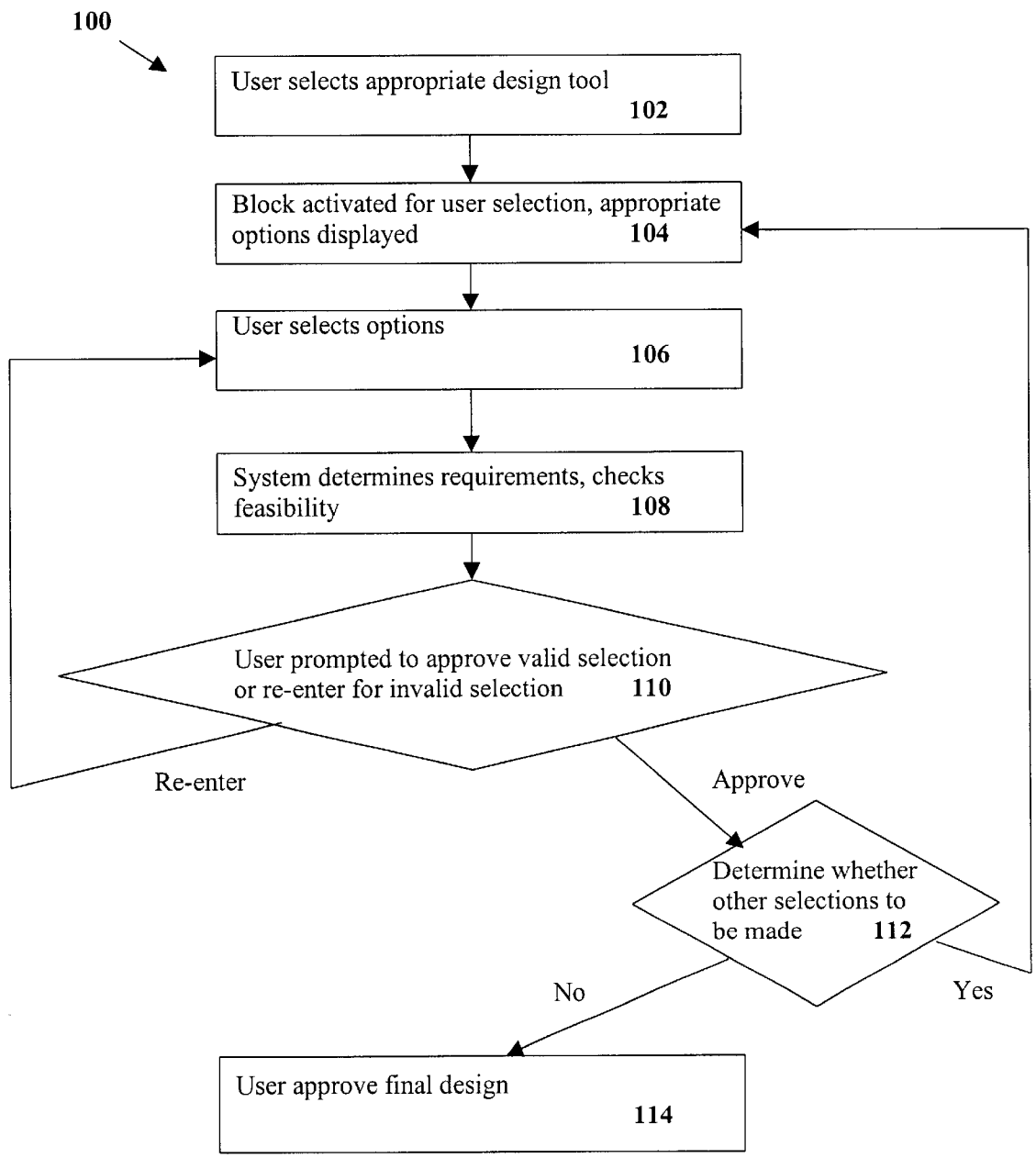
FIG. 1 is a flowchart showing steps of the design process in accordance with one embodiment of the present invention.

An example of a preferred such logic flowchart 100 is shown in FIG. 1. In the process, a user first selects an appropriate design tool to use 102, such as an option to design a motherboard for a desktop PC. The system then activates 104 the appropriate block for that selection, displaying to the user the appropriate options for that selection. The user then makes appropriate selections 106 from those options. The system checks the requirements of those selected options and determines the feasibility 108 of the resultant product. At this point, the user is either prompted to approve the final selection 110, if the combination of options is determined to be valid, or make alternate selections if the combination is not possible. Once a user has made all the appropriate selections and approved the options for a given block, the system determines whether or not there are other blocks that need to be addressed by the user 112. If so, the user is again displayed options from which to select. If not, the user is prompted for final approval of the design 114. As mentioned previously, the user has the ability to go backwards through the design process at any time before final approval in order to change selections or verify information.

This flowchart approach eliminates a significant amount of software that may otherwise be required to make the site functional using current methodology. The VPD toolset is preferably modular in design, such that it allows easy addition, deletion, and modification of options, modules, and uses within the VPD toolset without the need to fully revise the software. Only those software modules containing the desired changes need be revised and implemented. This approach significantly reduces development and maintenance time and lowers costs.

Figure 2:
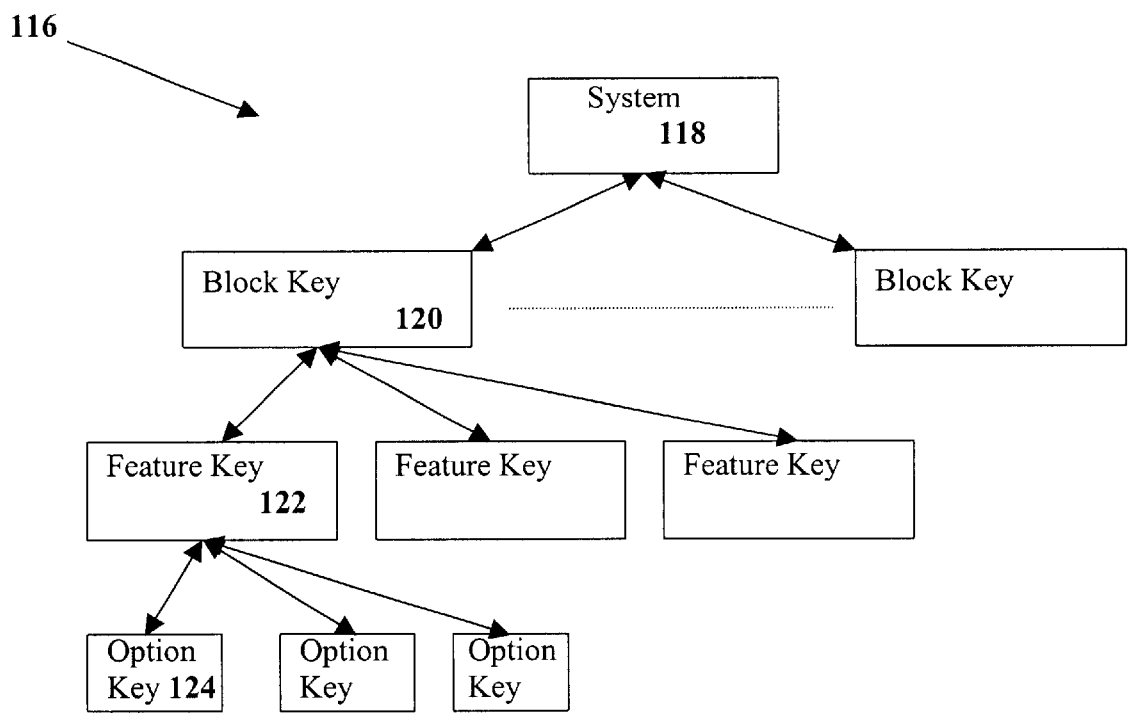
FIG. 2 is a diagram showing basic logic in accordance with one embodiment of the present invention.

As shown in FIG. 2, the preferred logic 116 to be used for a VPD toolset 118 of the present invention utilizes 3 flow keys—Block Keys 120, Feature Keys 122, and Option Keys 124. Block keys 120 preferably describe those functional categories that may typically be used in designing a board. Feature keys 122 preferably include a list of available selections within a functional block. Option keys 124 preferably refer to unique options that may be associated with a particular feature.

Figure 3:
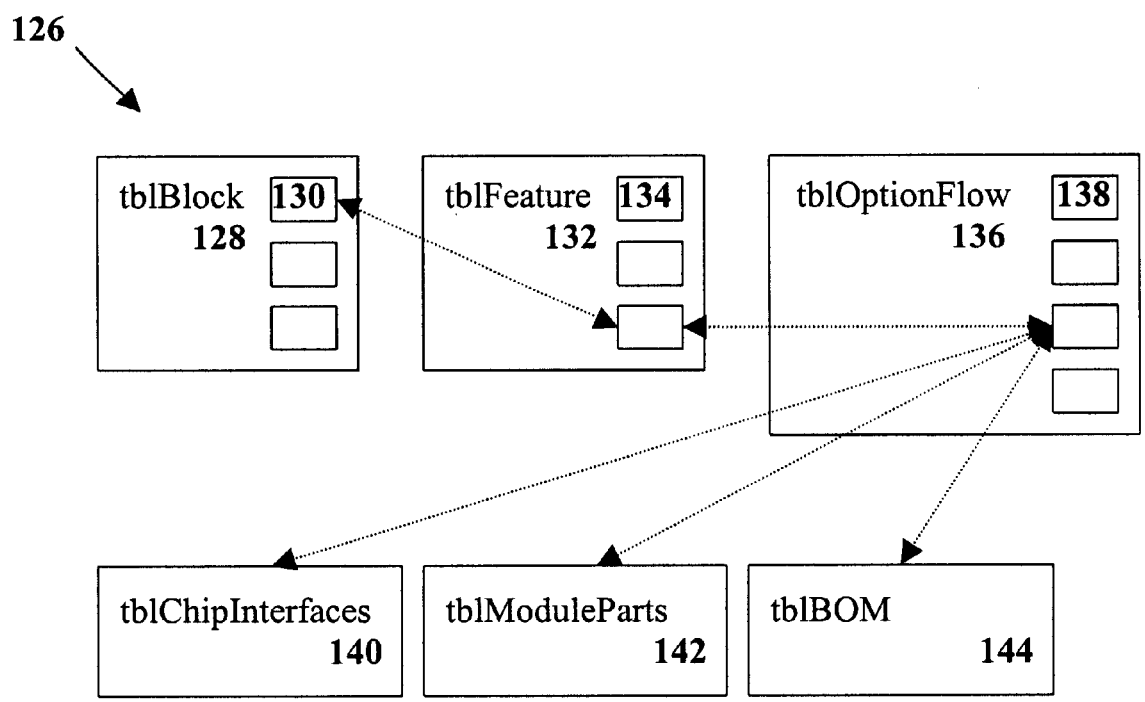
FIG. 3 is a diagram showing a table structure in accordance with one embodiment of the present invention.
Figure 4:
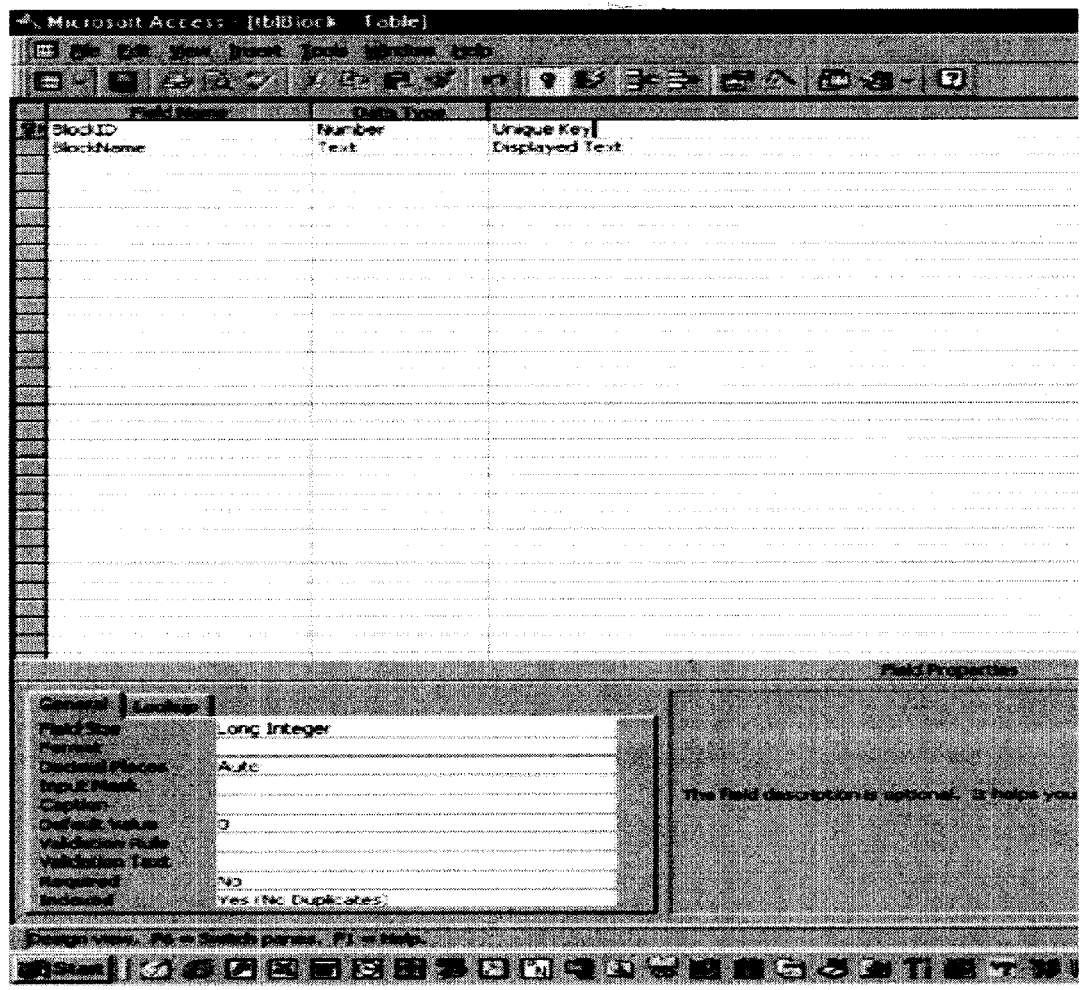
FIG. 4 is a screen shot of a table setup in accordance with one embodiment of the present invention.

As shown in FIG. 3, the system logic 126 is preferably integrated into 6 basic tables. The first table is preferably the tblBlock table 128. This table is used for the primary user navigation through the program, preferably breaking the design into separate categorical blocks 130 based on functionality. The tblBlock table 128 is preferably also used as the primary control for the logic flow.

The second preferred table, tblFeature 132, is preferably used for sub-navigation, such as in a left-hand frame of the user interface. This table preferably defines how features 134 are displayed and how a user selects such features. For instance, with a FeatureType of 2, a user may be prompted with a window containing radio buttons that may be used to select a particular feature. If the FeatureType is 3, a user may instead be prompted with an option box for entering user supplied data for a given feature, all of which is stored in a particular feature 134. This table is preferably related to and orders the preferred table 3, the tblOptionFlow table 136.

The tblOptionFlow table 136 may be used to display and control selection of the available options 138 associated with each feature. For example, this table may be used to determine the maximum number of physical slots per form factor that may be defined, providing interfaces associated with each selected option. A preferred field in this table, the ModuleID field, may be related to a field in the tblModuleParts 142 table, such as the ModuleID field, in order to extract cost, area, and power needed for each option. The working area may then be extracted from a FormFactorArea field.

A fourth table, such as a tblChipInterfaces table 140, may be used to calculate the maximum number of loads based on the chipset selected.

A fifth preferred table is the tblModuleParts table 142, mentioned previously. This table preferably stores the cost, area, power, and lead-time data for all modules. This table may be used to generate design feasibility calculations.

A sixth preferred table is the tblBOM table (bill of materials table) 144. This table may be used to store all necessary part numbers, descriptions, AVL (approved vendor list) data, and quantities per part.

The design process preferably begins once a user defines a design name and the appropriate design is loaded. The software initializes the tblBlock table and activates the first block, Form Factor. As the user makes additional selections, the necessary additional blocks become active. Once the form factor has been selected and the user moves on to the next block, the Form Factor block is disabled. This is true with the Chipset block as well.

The tblFeature table may then use the FeatureType field to determine the method and location for displaying the features for selection. The FeatureID field may be used to relate the tblFeature table and the tblOptionFlow table, such that the associated options are displayed for each feature selected. The tblOptionFlow table may also be used to determine the next prompt shown to the user. This may be done using the NextFeatureID. The process preferably continues until the design is completed.

The tblOptionFlow table may then be used to calculate the percentage of area required by the selected modules. Each module preferably has a unique identifier found in the ModuleID field. The ModuleID field is related to the tblModuleParts table. The cost, area, and power requirements for each module are stored in this table. The area required for all selected modules is then divided by the total available area, as determined by the form factor located in the FormFactorArea field.

To calculate single sided assembly area, the following formula is preferably used:

$$B/A = \text{Single Sided Assembly Area}$$

where A is the value of FormFactorArea from the tblOptionFlow table and B is the sum of the PartArea values for all the selected modules from the tblModuleParts table.

In an example for an ATX Form Factor (form factor compliant with the ATX specification), where $A=73,629$ mm$^2$ and $B=7,781.3883$ mm$^2$ (for 2 PCI slots, $B=1759.72$ mm$^2*2=3519.44$ mm, and for 1 TX chipset, $B=4,261.9483$ mm$^2$), the resultant percentage of the board being used by the selected components is $B/A=(7,781.3883/73,629)=0.10568$ or approximately 11%.

To calculate double-sided assembly area, the following formula may be utilized:

$$B/A = \text{Double Sided Assembly Area}$$

where $A=((\text{FormFactorArea})*1.5)$ from the tblOptionFlow table, and B is the sum of the PartArea values for all the selected modules from the tblModuleParts table.

In another example for an ATX Form Factor, where $A=(73,629 \text{ mm}^2)*1.5=110,443.50$ mm$^2$ and $B=7,781.3883$ mm$^2$ (for 2 PCI slots, $B=1759.72$ mm$^2*2=3519.44$ mm$^2$, and for 1 TX chipset, $B=4,261.9483$ mm$^2$), the resultant percentage of the board being used by the selected components is $B/A=(7,781.3883/110,443.50)=0.07045$ or approximately 7%.

The ModuleID values may be used to find the corresponding modules and add their powers, which are preferably found in the tblModuleParts table. Preferred fields used to accomplish this are the Maximum and Typical fields. A worst case calculation may be obtained by adding all Maximum values from the tblModuleParts table for each module selected. A typical case calculation may be obtained by adding all Typical values from the tblModuleParts table for each module selected.

Again using the ModuleID field in the tblModulesParts table, one may find the corresponding modules and determine the total cost, extracted from the CurrentCost field, and the maximum Lead-Time, extracted from the LeadTime field. The material cost may be obtained by adding all values in the CurrentCost field of the tblModuleParts table for the selected modules. The assembly labor cost is obtained by summing the number of parts, for the modules selected, found in the PartsCount field within the tblModuleParts table. A formula is then used to calculate the total estimated cost.

The production lead-time may be calculated by using the selected modules to query the LeadTime field in the tblModuleParts table. The greatest value returned is then used as the necessary production lead time. For example, if 15 modules are selected with a LeadTime of 5 weeks and 1 module is selected with a LeadTime of 12 weeks, the necessary Production Lead time is taken to be 12 weeks, so as to be sufficient for all modules.

The tblOptionFlow table is preferably used to calculate and validate the maximum number of physical slots available for the selected form factor, as shown in FIG. 3. Each form factor has a sufficient number to interface types to be used in a design, but in a preferred embodiment has up to three different interface types. This information may be stored in appropriate fields, such as Interface 1, Interface2 and Interface3.

Each interface may have a limited number of interface slots that can be defined. This information may be stored in corresponding fields Slots1, Slots2, and Slots3. Each form factor, though, has a maximum number of physical slots available for use, preferably as defined in the TotalSlotsAvailable field.

An ATX form factor can allow up to 4 PCI interface slots, 8 ISA interface slots, and 1 AGP interface slot. However the total physical slots available for an ATX form factor is 8. Therefore, a user cannot use the maximum number of each interface slot, as it would exceed the 8 physical slot total on an ATX form factor. To check this, the user is preferably prompted to fill in the number of connectors needed and is then shown the total number of connectors allowed with the selected form factor. Other appropriate alternatives may be used, such as prompting a user once the desired total exceeds the total number possible, or not allowing entry of a total number of slots greater than is possible Interface loads are preferably validated as the module selections are made, in order to ensure that the maximum load has not been exceeded. When the OptionID is selected, the InterfaceID field for that record is, also preferably automatically checked. Additionally the FeatureType field is preferably also checked automatically If the FeatureType field equals 3, the user must type in a quantity. That quantity is then preferably multiplied by the load associated with the value stored in the Load field. Once the total loads have been calculated, the tblChipInterfaces table may be checked to ensure that the user has not exceeded the maximum loads allowed for the interface.

The ChipSetID and InterfaceID fields must preferably be selected before the InterfacesAllowed field may be selected. The tblChipInterfaces table preferably contains the ChipSetID and InterfaceID fields. If the InterfacesAllowed field value is exceeded, an error message is preferably displayed prompting the user to adjust the selections.

A system of the present invention may be utilized on any computer or terminal having access to the current design tables. As such, the system may be operated via any appropriate means, such as operating on-site at a company terminal, working on a terminal at a remote location connecting to a network housing these tables, or connecting through an Internet browser, wherein the tables are accessible through a web site or other Internet-based source. The toolset may be accessible to the public, or may be limited to those persons granted access to the system. Separate tables may be setup to handle security matters, which may or may not be part of the main system. Security may be handled by a module of the VPD system that is adapted to query a database behind a firewall or other security measure in order to maintain such information in confidence.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A table-driven system for guiding a user through the design of an electronic component, said system comprising:
   a) a plurality of design tables, said design tables adapted to store data relating to at least one said electronic component and logic related to the design of said electronic component;
   b) a modular program adapted to extract said data from said plurality of design tables and prompt said user with options, said modular program containing system logic designed to utilize said data in said guiding of said user, said prompted options limited by said system logic and at least one of said plurality of design tables in accordance with the feasibility of the design of said electronic component; and
   c) at least one terminal adapted to allow said user to make selections from said prompted options and to modify the design of said electronic component, wherein the feasibility of the design of said electronic component is determined according to logic in said design tables as said user makes said selections from said prompted options such that upon completion of said selections, said electronic component design is feasible.

2. A table-driven system according to claim 1 wherein one of said plurality of design tables is a Block table adapted to separate said design into separate categorical blocks by functionality.

3. A table-driven system according to claim 2 wherein said categorical blocks are further adapted to control flow of said system logic.

4. A table-driven system according to claim 1 wherein one of said design tables is a Feature table adapted to assist in directing flow of said system logic, said electronic component having features and said Feature table adapted to define how said features are displayed to said user.

5. A table-driven system according to claim 1 wherein one of said design tables is an Option Flow table adapted to contain information as to said options to be prompted to said user, said options associated with said electronic component.

6. A table-driven system according to claim 1 wherein one of said design tables is an Interface table adapted to contain, load information relevant to said electronic component.

7. A table-driven system according to claim 1 wherein one of said design tables is a Module Parts table adapted to store part data relating to the modules of said modular program.

8. A table-driven system according to claim 7 wherein said part data is selected from the group consisting of cost, power, area, and lead-time data.

9. A table-driven system according to claim 1 wherein one of said design tables is bill of materials table adapted to contain bill of materials data relating to the physical parts of said electronic component.

10. A table-driven system according to claim 9 wherein said bill of materials data is selected from the group consisting of part numbers, part descriptions, approved vendor list data, and quantities per part.

11. A table-driven system according to claim 1 wherein each module of said modular design has a unique identifier.

12. A method for guiding a user through the design of an electronic component, said method comprising the steps of:
   a) creating a plurality of design tables comprising logic for determining the feasibility of the design of an electronic component;
   b) prompting the user to select a type of said electronic component to be designed;
   c) activating the appropriate block for said selected electronic component type, said block adapted to interface with data from said plurality of design tables in order to prompt said user to enter selections for each feature of the selected component type, wherein said selections are limited in accordance with the feasibility of the design of said electronic component;

d) collecting from said user selections for each said feature in response to each said prompt;

e) for said user selections for each said feature in response to each said prompt;
  (i) checking the requirements and the feasibility of the design of said electronic component related to said user selections according to said design tables; and
  (ii) prompting said user to make alternate selections if the combination of user selections is not feasible;

f) prompting said user for approval of said electronic component determined to be feasible upon completion of said user selections for each said feature in response to each said prompt.

13. A method according to claim 12 additionally comprising the step of repeating steps (b) through (e) for each said block appropriate for said electronic component type.

14. A method according to claim 12 wherein said requirements are selected from the group consisting of cost, area, and power requirements.

15. A method according to claim 12 wherein one of said design tables is a Block table adapted to separate said design into separate categorical blocks based on functionality.

16. A method according to claim 12 wherein one of said design tables is a Feature table adapted to assist in directing flow of said design, said electronic component having features and said Feature table adapted to define how said features are displayed to said user.

17. A method according to claim 12 wherein one of said design tables is an Option Flow table adapted to contain information as to options to be displayed to said user, said options associated with said electronic component.

18. A method according to claim 12 wherein one of said design tables is an Interface table adapted to contain information load information relevant to said electronic component.

19. A method according to claim 12 wherein one of said design tables is a Module Parts table adapted to store parts data relating to said electronic component.

20. A method according to claim 12 wherein one of said design tables is a bill of materials table adapted to contain bill of materials data relating to the physical parts of said electronic component.

* * * * *